(12) United States Patent
Fish et al.

(10) Patent No.: US 11,655,762 B2
(45) Date of Patent: May 23, 2023

(54) GAS TURBINE ENGINE WITH TRAILING EDGE HEAT EXCHANGER

(71) Applicant: PRATT & WHITNEY CANADA CORP., Longueuil (CA)

(72) Inventors: Jason Fish, Oakville (CA); Charlie Molina, Brampton (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 782 days.

(21) Appl. No.: 16/377,954

(22) Filed: Apr. 8, 2019

(65) Prior Publication Data

US 2020/0318545 A1  Oct. 8, 2020

(51) Int. Cl.
*F02C 6/08* (2006.01)
*F02C 7/14* (2006.01)
*F02C 7/143* (2006.01)
*F02C 3/06* (2006.01)

(52) U.S. Cl.
CPC ............... *F02C 7/143* (2013.01); *F02C 3/06* (2013.01); *F02C 6/08* (2013.01); *F05B 2260/20* (2013.01)

(58) Field of Classification Search
CPC ..... F05D 2260/213; F05D 2260/22141; F05D 2260/30; F05D 2260/33; F05D 2260/39; F05D 2240/122; F28D 7/02; F28D 7/085; F28D 1/0478; F02C 6/08; F02C 7/141; F02C 7/18; F02C 7/185; F02C 7/143; F01D 9/065; F02K 3/115
See application file for complete search history.

(56) References Cited

U.S. PATENT DOCUMENTS

| | | | |
|---|---|---|---|
| 4,645,415 A | | 2/1987 | Hovan et al. |
| 4,972,671 A | * | 11/1990 | Asselin .................... F01D 9/065 184/6.11 |
| 5,119,626 A | * | 6/1992 | Lardellier ............... F02C 3/067 60/244 |
| 5,203,163 A | * | 4/1993 | Parsons ..................... F02C 6/08 60/226.1 |
| 5,729,969 A | * | 3/1998 | Porte ......................... F02C 6/08 60/226.1 |
| 5,782,077 A | | 7/1998 | Porte |
| 7,862,293 B2 | * | 1/2011 | Olver ...................... F01D 25/12 415/169.1 |
| 8,621,839 B2 | * | 1/2014 | Alecu ....................... F02C 7/06 60/39.08 |
| 9,476,313 B2 | * | 10/2016 | Caprario ................. F01D 9/065 |
| 2008/0053060 A1 | * | 3/2008 | Olver ....................... F02C 7/14 60/226.1 |
| 2017/0261383 A1 | * | 9/2017 | Sommervogel .......... G01K 7/16 |

\* cited by examiner

*Primary Examiner* — Alain Chau
*Assistant Examiner* — Sean V Meiller
(74) *Attorney, Agent, or Firm* — Norton Rose Fulbright Canada LLP

(57) ABSTRACT

A gas turbine engine includes a fan assembly, a compressor assembly, a combustion chamber, a turbine assembly, a bypass duct conveying rearward a bypass airstream driven by the fan assembly when the gas turbine engine is in use, a fairing extending across at least a portion of the bypass duct downstream of the fan assembly, and a heat exchanger having an inlet fluidly connected to the compressor assembly and an outlet fluidly connected to a pneumatic actuator of the gas turbine engine. The fairing has a leading edge and a trailing edge. The heat exchanger is disposed adjacent the trailing edge of the fairing.

15 Claims, 6 Drawing Sheets

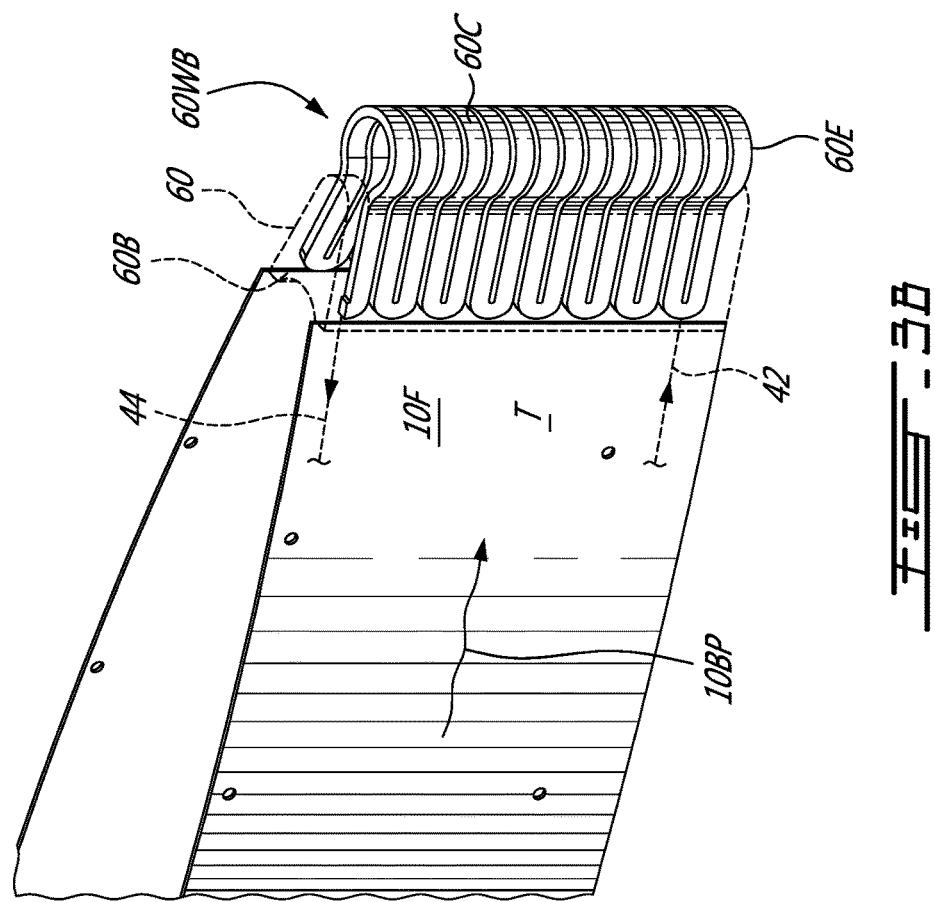
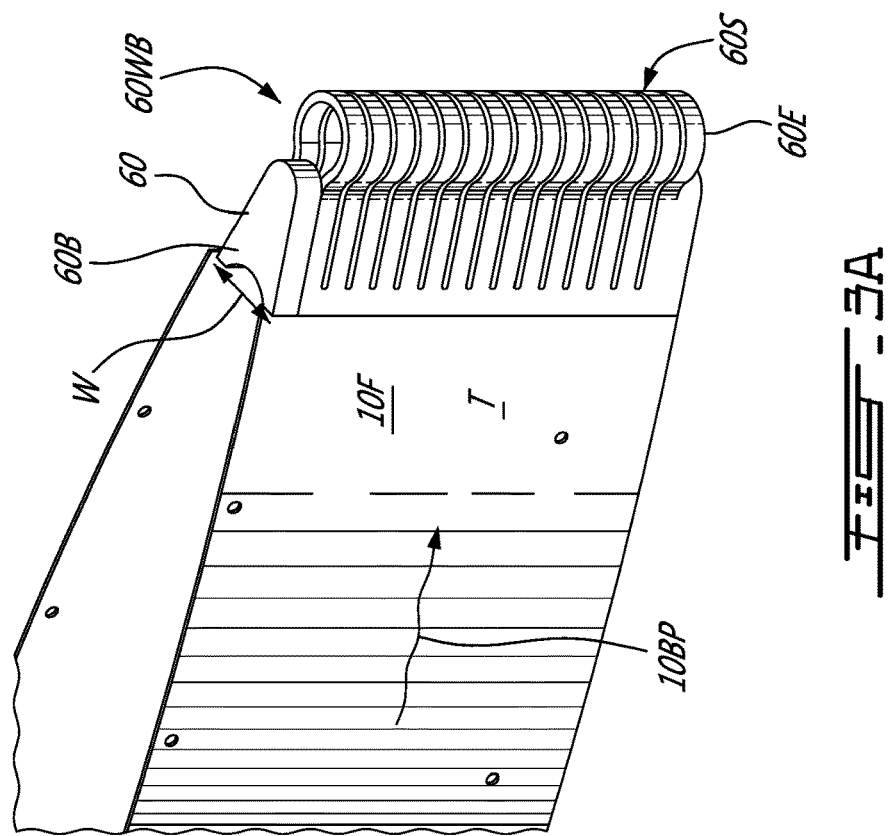

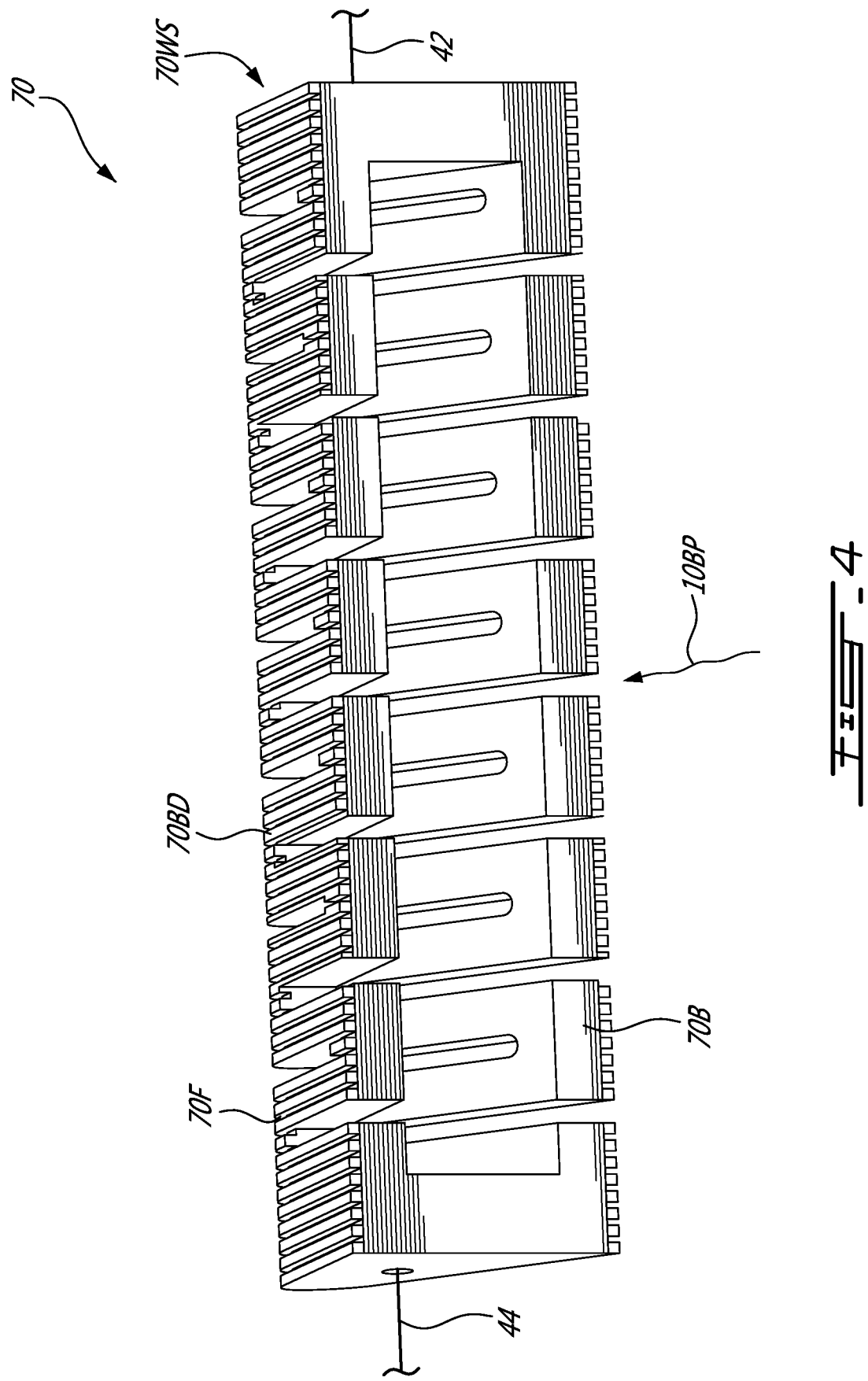

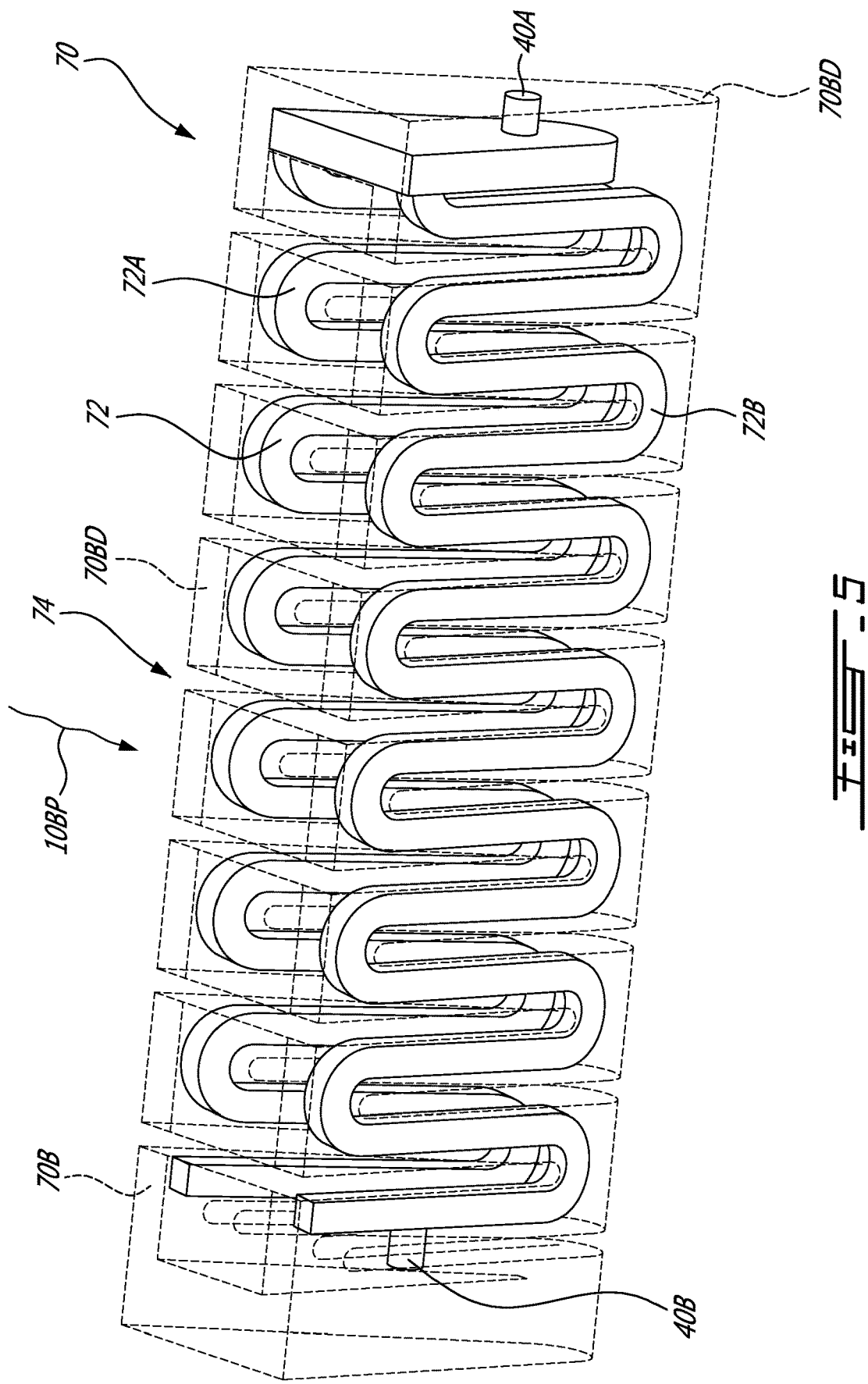

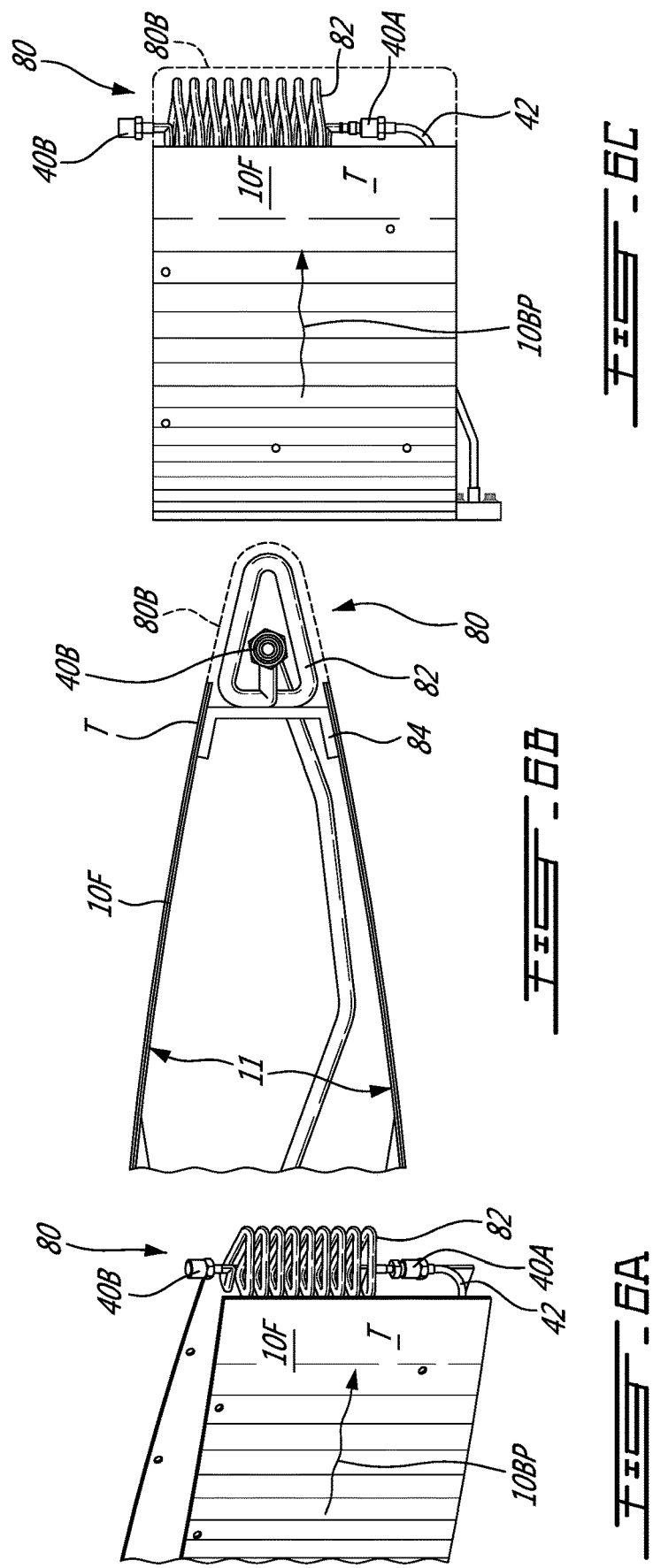

GAS TURBINE ENGINE WITH TRAILING EDGE HEAT EXCHANGER

TECHNICAL FIELD

The application relates to aircraft gas turbine engines.

BACKGROUND

Aircraft typically use one or more pneumatic systems. In some cases, the pneumatic systems require a pressurized fluid, such as air, to operate. Prior art systems for providing such pressurized fluid exist and are suitable for their intended purposes. However, improvements to the prior art are always desirable.

SUMMARY

In one aspect, there is provided a gas turbine engine, comprising a fan assembly, a compressor assembly, a combustion chamber, a turbine assembly, a bypass duct conveying rearward a bypass airstream driven by the fan assembly when the gas turbine engine is in use, and a fairing extending across at least a portion of the bypass duct downstream of the fan assembly, the fairing having a leading edge and a trailing edge, and a heat exchanger having an inlet fluidly connected to the compressor assembly and an outlet fluidly connected to a pneumatic actuator of the gas turbine engine, the heat exchanger being disposed adjacent the trailing edge of the fairing.

In some embodiments, the heat exchanger is connected to the fairing via a bracket.

In some embodiments, the bracket is disposed at least in part inside the fairing.

In some embodiments, the bracket is disposed in its entirety inside the fairing and is attached to at least one inner surface of the fairing, and the heat exchanger includes a body that completes a shape of the fairing, and a tortuous fluid conduit disposed inside the body, the inlet of the heat exchanger being one end of the tortuous fluid conduit and the outlet of the heat exchanger being at another end of the tortuous fluid conduit.

In some embodiments, the tortuous fluid conduit is defined by at least one coiled tube.

In some embodiments, the heat exchanger includes a body, the body having a wishbone shape.

In some embodiments, the body includes a wedge shaped base portion attached to the trailing edge of the fairing, and a rear end portion extending rearward from the base portion, the rear end portion defining slots extending through the rear end portion.

In some embodiments, the slots extend into the base portion.

In some embodiments, the slots extend in a direction of the bypass airstream.

In some embodiments, the base portion is complementary in shape to the trailing edge of the fairing.

In some embodiments, the heat exchanger includes a body and a flow channel extends through the body, the flow channel is fluidly connected to the at least one of the compressor assembly and the combustion chamber, and the flow channel occupies a majority of a volume of the body.

In some embodiments, the fairing is disposed inside the bypass duct.

In some embodiments, the pneumatic actuator is connectable to a pneumatic system of an aircraft.

In some embodiments, the heat exchanger includes a unitary body that defines both a serpentine cooling channel therethrough and a serpentine air flow path therethrough, the cooling channel fluidly connecting the inlet to the outlet.

In another aspect, there is provided a gas turbine engine, comprising a fan assembly, a compressor assembly, a combustion chamber, a turbine assembly, and a bypass duct conveying rearward a bypass airstream driven by the fan assembly when the gas turbine engine is in use, and a heat exchanger having an inlet fluidly connected to the compressor assembly via a bleed conduit and an outlet fluidly connected to a pneumatic actuator, the heat exchanger defining a part of an inner surface of the bypass duct.

In some embodiments, the heat exchanger is disposed at a trailing edge of a fairing of the bypass duct.

In some embodiments, the heat exchanger has a body having a triangular shape, the triangular shape having a wider portion and a narrower portion, the wider portion of the triangular shape of the body being attached to the trailing edge.

In some embodiments, the body is shaped as an airfoil.

In some embodiments, the trailing edge is part of a fairing of the gas turbine engine, and the fairing defines a bypass air exhaust nozzle of a bypass duct of the gas turbine engine.

In yet another aspect, there is provided a method supplying compressed air in a gas turbine engine for use in a pneumatic actuator, comprising bleeding a supply of compressed air from a compressor assembly of the gas turbine engine, directing the supply of compressed air to an inlet of a heat exchanger disposed at a trailing edge of a fairing of the gas turbine engine, the trailing edge being part of a bypass duct of the gas turbine engine, and directing the supply of compressed air from an outlet of the heat exchanger to the pneumatic actuator.

Further details of these and other aspects of the described subject matter will be apparent from the detailed description and drawings included below.

DESCRIPTION OF THE DRAWINGS

Reference is now made to the accompanying figures in which:

FIG. 3A is a perspective view of a part of a trailing edge of a fairing of the gas turbine engine of FIG. 1, showing another embodiment of the heat exchanger of FIG. 1 attached thereto;

FIG. 3B is a partially transparent perspective view of the heat exchanger of FIG. 1;

FIG. 4 is a perspective view of yet another embodiment of the heat exchanger of FIG. 1;

FIG. 5 is a transparent perspective view of the heat exchanger of FIG. 4;

FIG. 6A is a perspective view of a part of a trailing edge of a fairing of the gas turbine engine of FIG. 1, showing yet another embodiment of the heat exchanger of FIG. 1, with a part of the heat exchanger removed to show internal components thereof;

FIG. 6B is a top plan view of the part of the fairing and the heat exchanger of FIG. 6A, and FIG. 6C is a side view of the fairing and the heat exchanger of FIG. 6A.

It will be noted that throughout the appended drawings, like features are identified by like reference numerals.

DETAILED DESCRIPTION

For the purposes of the present description, the term "conduit" is used to describe an arrangement of one or more elements that together form a flow path or flow paths for fluid(s) to flow from point A to point B. For example, a given conduit used to convey compressed hot air and/or exhaust gases may be defined by any number and combination of hoses/tubes/filters/bores/valves/fittings and the like, selected to be suitable for the described purpose(s) of the given conduit, and fluidly suitably interconnected to provide for the described function(s) of the given conduit.

Figure 1:
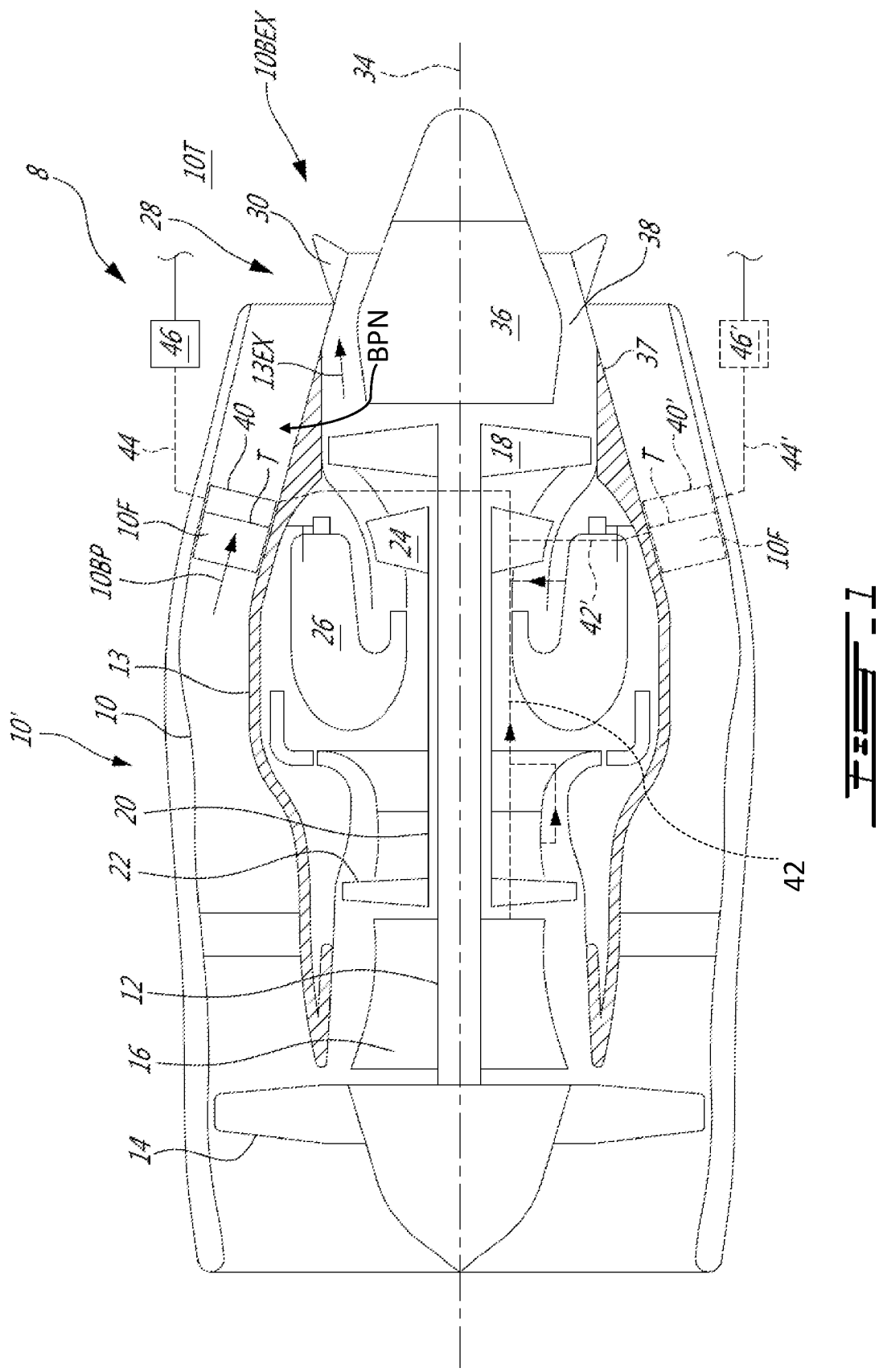
FIG. 1 is a partial cross-sectional view of a turbofan gas turbine engine, comprising a trailing edge heat exchanger.

FIG. 1 illustrates a turbofan engine 8 (a.k.a., aeroengine) which includes a bypass duct 10, a core casing 13, a low pressure spool assembly 12 which includes a fan assembly 14 and a low pressure compressor assembly 16 coupled to a low pressure turbine assembly 18, and a high pressure spool assembly seen generally at 20 which includes a high pressure compressor assembly 22 coupled to a high pressure turbine assembly 24.

The core casing 13 surrounds the low and high pressure spool assemblies 12, 20 in order to define a main fluid path (not numbered) therethrough. In the main fluid path there is provided a combustion chamber 26 in which a combustion process produces combustion gases that power the high and low turbine pressure assemblies 24, 18. The bypass duct 10 and the core casing 13 define an annular bypass duct 10 therebetween for directing some of the air compressed by the fan assembly 14 rearward out of the gas turbine engine 8 for generating thrust.

In the present embodiment, the core casing 13 includes a turbine exhaust case (TEC) 28 that forms a downstream end of the core casing 13 and a TEC mixer 30 is attached to a downstream portion of the TEC 28. The TEC 28 includes an annular hub 36, a.k.a., an inner shroud. An outer shroud 37 and the TEC mixer 30 surround the hub 36 to form an annular exhaust gas duct 38 disposed radially therebetween.

The TEC mixer 30 mixes a stream of hot exhaust gases 13EX discharged from the high and low pressure turbine assemblies 24, 18 through the main fluid path and the annular exhaust gas duct 38, with a bypass airstream 10BP driven by the fan assembly 14 through the annular bypass duct 10. It is contemplated that the gas turbine engine 8 may be of a different configuration. It is contemplated that the TEC mixer 30 may be omitted for example.

Referring to FIG. 1, the gas turbine engine 8 has a central axis 34 about which the various compressor and turbine assemblies 12, 14, 18 and 24 described above are rotatable. For the purposes of this document, the terms "upstream" and "downstream" are used to refer to the direction of a fluid flow passing through the main fluid path of an engine. The terms "axial", "radial" and "circumferential" are used with respect to the central axis 34 of the gas turbine engine 8. The terms "forward" and "rearward" are used with respect to the direction of flight.

Still referring to FIG. 1, the gas turbine engine 8 includes a heat exchanger 40 attached to a trailing edge T of a fairing 10F extending across the bypass duct 10 and the bypass airstream 10BP. For instance, the fairing 10F is radially oriented relative to the central axis 34. Referring to FIG. 1, the fairing 10F defines a bypass air exhaust nozzle BPN of the bypass duct 10. The fairing 10F is a stream traversing member that houses components of the gas turbine engine 10. For example, in addition to the heat exchanger 40, the fairing 10F may house cable harnesses, fluid lines, structural components, such as beams, etc. The fairing 10F shields these components, and has an aerodynamic shape taking into consideration drag.

In an embodiment, the fairing 10F is non-structural, though it may contribute to the structure of the gas turbine engine 10. For example, the fairing 10F may have structural components and non-structural components. The fairing 10F is shown in more detail in FIG. 2. As shown, the heat exchanger 40 is attached at or adjacent to the trailing edge T of the fairing 10F and completes the shape of the fairing 10F. In this embodiment, the fairing 10F has a leading edge L that faces the bypass airstream 10BP. The fairing 10F has an aerodynamic shape that extends from the leading edge L to the trailing edge T. As shown, the heat exchanger 40 completes the aerodynamic shape of the fairing 10F.

Referring back to FIG. 1, the heat exchanger 40 is fluidly connected via a bleed conduit 42 to the high pressure compressor assembly 22 to receive pressurized air from the high pressure compressor assembly 22 when the gas turbine engine 8 is in use. Also as shown, in some embodiments, the heat exchanger 40 may also be fluidly connected via the bleed conduit 42 to the low pressure compressor assembly 16 to receive pressurized air from the low pressure compressor assembly 16 when the gas turbine engine 8 is in use.

Also as shown, in some embodiments, the heat exchanger 40 is fluidly connected via the bleed conduit 42 to the combustion chamber 26 to receive hot high pressure exhaust gases from the combustion chamber 26 when the gas turbine engine 8 is in use. It is contemplated that the heat exchanger 40 may have a combination of one or more of the above-mentioned fluid connections with suitable valving and/or other conventional elements to selectively receive compressed air and/or exhaust gases from one or more of the abovementioned sources. It is contemplated that any suitable routing of the bleed conduit(s) 42 may be used.

Still referring to FIG. 1, the heat exchanger 40 further includes a supply fluid conduit 44 that supplies air/gases to one or more pneumatic system(s) or other element(s) of the gas turbine engine 8 and/or of the aircraft with which the gas turbine engine 8 is used. More particularly, the air and/or exhaust gases (depending on each particular fluid bleed arrangement described above) are those that have passed through the heat exchanger 40 and have thereby cooled down.

For simplicity, the air and/or exhaust gases supplied from the heat exchanger 40 is/are further referred to as servo fluid. It is contemplated that the gas turbine engine 8 may have more than one heat exchanger 40 according to the present technology, as shown with dashed lines 40', 42', 44' and 46' in FIG. 1, used to provide the servo fluid to one or more pneumatic actuators 46, 46' of the gas turbine engine 8 or other elements requiring servo fluid.

As shown in FIG. 1, the supply fluid conduit 44 may in part be defined by and/or may connect to one or more pneumatic actuators 46 and/or other control elements. In some embodiments, such elements 46, 46' may be used to control the supply of the servo fluid to the one or more destination(s)/use(s)/system(s), such as one or more pneumatic systems of the gas turbine engine 8 and/or of the aircraft with which the gas turbine engine 8 is used. In some embodiments, such elements 46, 46' are part of the gas turbine engine 8.

In some embodiments, the servo fluid may be used to power a cowl anti ice valve actuation system (not shown). In some embodiments, the fluid conduits 42, 44 and the heat exchanger 40 are sized so as to provide a sufficient supply of servo fluid to operate/actuate the one or more pneumatic actuators 46 and/or pneumatic system(s) of the gas turbine engine 8 and/or the aircraft. In some such cases, no additional power besides the energy already present in the servo fluid is required to operate/actuate the pneumatic element(s) and system(s).

It is contemplated that the servo fluid may be used for any one of a range of different uses, including for actuating pneumatic valves of the gas turbine engine 8 and/or the aircraft with which the gas turbine engine 8 is used for example. It is also contemplated that known engineering principles and design methods may be used to determine the dimensions, materials, and other characteristics of each particular embodiment of the heat exchanger 40 and the fluid conduit(s) 42, 44 to withstand the various contemplated operating temperatures of the servo fluid and to provide suitable cooling of the servo fluid, depending on each particular embodiment of the gas turbine engine 8 and/or the fluid source(s) from which the heat exchanger(s) 40 is/are fed, and/or the particular fluid system(s) or element(s) that is/are to be supplied with the servo fluid from the heat exchanger(s) 40. The servo fluid may also be referred to as being part of a compressed air network.

Figure 2:
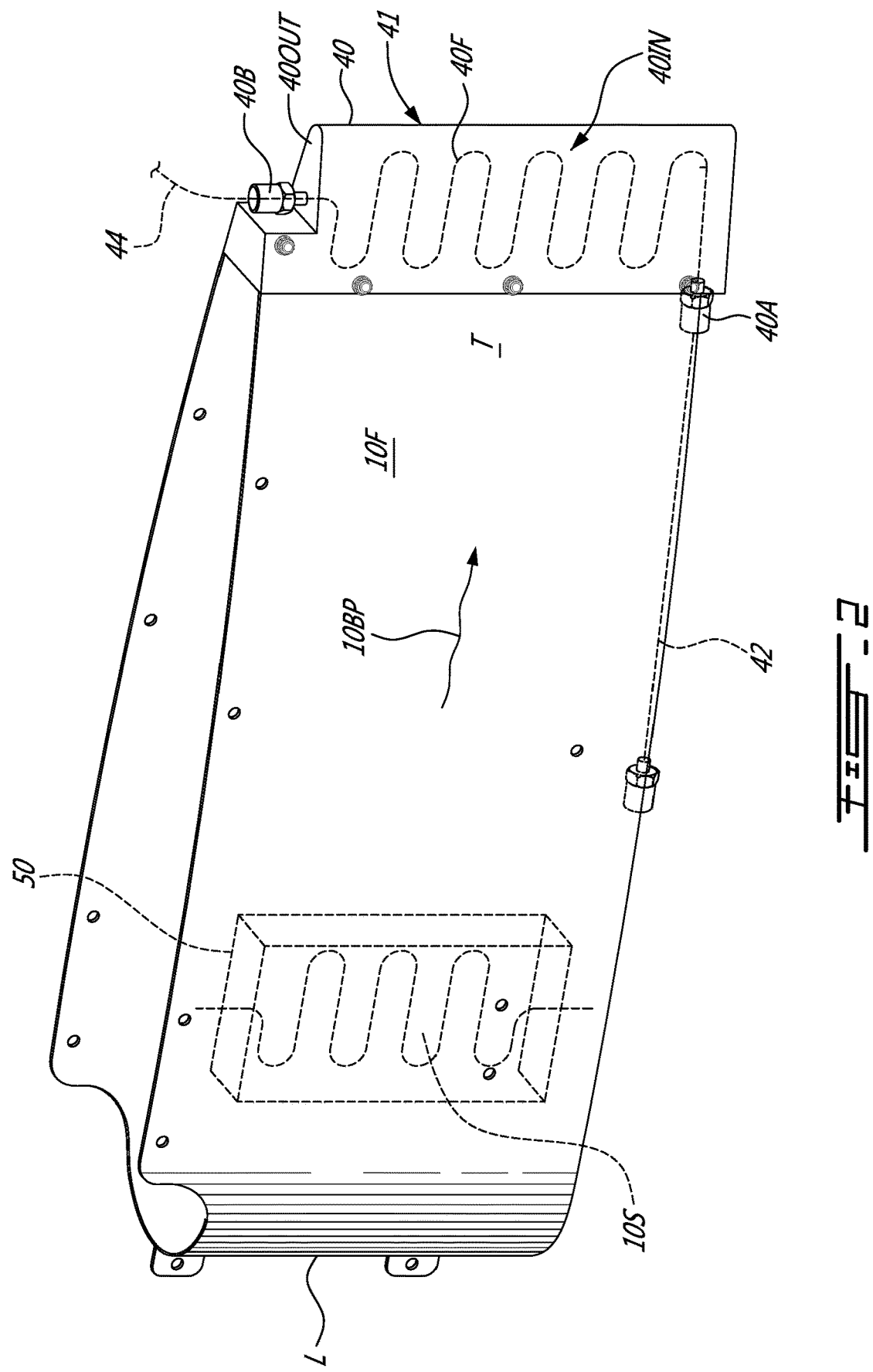
FIG. 2 is a perspective view of a part of a trailing edge of a fairing of the gas turbine engine of FIG. 1, showing the heat exchanger attached thereto.

Now referring to FIG. 2, the heat exchanger 40 includes a body 41 that is bolted to the trailing edge T of the fairing 10F and has an aerodynamic shape that completes the trailing edge T. More particularly, in the particular embodiment, the body 41 is a National Advisory Committee for Aeronautics (NACA) airfoil. As shown, the outer surfaces of the body 41 are sized and shaped to be a continuation of the outer surfaces and shape of the fairing 10F, with substantially no part of the body 41 extending from the inner and outer surfaces of the fairing 10F. In at least some cases, this helps reduce any impact of the heat exchanger 40 on the bypass airstream 10BP and hence on an operating efficiency of the gas turbine engine 8.

The fairing 10F is one example of a fairing to which the heat exchanger 40 may be attached and/or integrated according to the present technology. It is contemplated that the heat exchanger 40 may be attached and/or integrated into a trailing edge of a different component of the gas turbine engine 8 so as to be at least in part in contact with the bypass airstream 10BP. The aerodynamic configurations described above, and placements, help reduce any impact on the specific fuel consumption of the gas turbine engine 8 in at least some operating conditions. It is contemplated that to help further reduce any possible impact on the specific fuel consumption, the heat exchanger 40 may be attached to the fairing 10F via an adhesive and/or internal clips and/or internal fasteners, or by being made integral with the fairing 10F, so as to have no part of the body 41 forming a radial edge or other portion that would extend from the outer surface of the fairing 10F.

Still referring to FIG. 2, in the present embodiment, an inlet 40A and an outlet 40B are disposed at opposed ends of the body 41, although other relative positions are also possible. As schematically shown with dashed lines, a serpentine flow channel 40F is defined through the body 41 and fluidly connects the inlet 40A to the outlet 40B. The bleed conduit 42 is fluidly connected to the inlet 40A. In turn, the supply fluid conduit 44 is fluidly connected to the outlet 40B. In some embodiments, such as in the alternative embodiments described later in this document, the flow channel 40F has a different shape and/or includes a different number of flow paths and/or passes through the heat exchanger 40.

As shown in FIG. 2, as air and/or exhaust gases pass through the flow channel 40F, the air and/or exhaust gases is/are cooled down by airflow passing over the body 41. More particularly, in the present embodiment, when the gas turbine engine 8 is in use, the bypass airstream 10BP flows over an inner surface 40IN of the body 41 of the heat exchanger 40 and ambient air outside of the gas turbine engine 8 flows over an outer surface 40OUT of the body 41 of the heat exchanger 40. These flows provide convective cooling to the air and/or exhaust gases passing through the heat exchanger 40, and creates the lower temperature servo fluid at the outlet 40B of the heat exchanger 40.

The bypass airstream 10BP may have a higher velocity than ambient airflow, and therefore provides relatively more cooling per unit area of the body 41 than the ambient airflow. In some cases, this allows to reduce the size of the heat exchanger 40. Additionally, the position of the heat exchanger 40 at the trailing edge T of the bypass duct 10 reduces likelihood and/or potential for foreign object damage to the heat exchanger 40.

In some embodiments, the shape and/or placement/integration of the heat exchanger 40 may be different. For example, as shown schematically in FIG. 2, in some embodiments a majority of a heat exchanger 50, which is an alternative embodiment of the heat exchanger 40, is disposed inside the fairing 10F and the inner surface 40IN of the heat exchanger 50 defines part of an inner surface 10S of the bypass duct 10, with a rest of the heat exchanger 50 being inside the bypass duct 10/fairing 10F. It is contemplated that any suitable construction and/or materials may be used to suit each embodiment and position of the heat exchanger 40, 50. For example, in some embodiments the heat exchanger 50 and at least an outer skin of the fairing 10F may be 3D-printed integral to each other, so as to maintain an original aerodynamic shape of the fairing 10F.

Now referring to FIGS. 3A and 3B, a heat exchanger 60 is shown, which is yet another embodiment of the heat exchangers 40 and 50. The heat exchanger 60 has a wishbone shape 60WB, which includes a wedge/triangular shaped base portion 60B attached to the trailing edge T of the fairing 10F and a rear end portion 60E extending rearward from the base portion 60B. In some applications, the wishbone shape 60WB in combination with the trailing edge T position improves a rate of cooling of fluid passing through the heat exchanger 60 per unit area and/or unit volume occupied by the heat exchanger 60, relative to at least some prior art heat exchangers in similar operating conditions.

In some embodiments, the base portion 60B of the heat exchanger 60 has a width (W) (FIG. 3A) that is substantially equal to, and in some embodiments, smaller than, a width (WN) of a corresponding part of the trailing edge T of the fairing 10F to which the shaped base portion 60B of the heat exchanger 60 is attached. As shown, in some embodiments, the base portion 60B has a partial wedge/triangular shape that is complementary to a shape of a corresponding part of the trailing edge T of the bypass duct 10/fairing 10F to which it is attached. In some embodiments, the base portion 60B is part of the trailing edge T of the fairing 10F and/or integral therewith.

The rear end portion 60E of the heat exchanger 60 is at least in part convex, and defines slots 60S therein. As shown, in the present embodiment, the slots 60S extend from the rear end portion 60E into the base portion 60B. Also in the present embodiment, the slots 60S extend in a direction of the bypass airstream 10BP and define fins that help improve heat transfer from the fluid passing through the heat exchange 60 into the bypass airstream 10BP. In at least some applications, the slots/fins 60S, in combination with the wishbone shape 60WB and the trailing edge T position, improve a rate of cooling of the fluid(s) passing through the heat exchanger 60 per unit area and/or unit volume occupied by the heat exchanger 60, relative to at least some prior art heat exchangers in similar operating conditions. Also as shown, in some embodiments, the rear end portion 60E of the heat exchanger 60 defines an annulus 60A therethrough, which in at least some cases also helps to improve heat transfer rates provided by the heat exchanger 60. In some embodiments, the annulus 60A is omitted.

As shown in FIG. 3B, a tortuous, wishbone-shaped, cooling channel 60C is defined through the base portion 60B and the rear end portion 60E, In the present embodiment, the cooling channel 60C occupies a majority of a volume of the wishbone shape 60WB of the heat exchanger 60. This also helps improve heat transfer rate per unit area of the heat exchanger 60, in at least some applications and/or flight conditions.

In some embodiments, the heat exchanger 60 and the tortuous cooling channel 60C are manufactured using an additive manufacturing process, such as 3D printing. In at least some cases, using an additive manufacturing process helps increase a ratio between a surface area of the cooling channel 60C to an outer surface area of the heat exchanger 60. In at least some cases, this also helps to increase the volumetric portion of the heat exchanger 60 occupied by the cooling channel 60C and/or the number of turns and/or passes in the cooling channel 60C. These features help improve heat transfer rate per unit area of the heat exchanger 60 in at least some applications and/or flight conditions.

Reference is now made to FIG. 4, which shows a heat exchanger 70. The heat exchanger 70 is yet another embodiment of the heat exchangers 40, 50 and 60. The heat exchanger 70 has a unitary body 70BD that defines a combined wedge-serpentine shape 70WS. Similar to the heat exchanger 40, a base portion 70B is attached to the trailing edge T of the bypass duct 10/fairing 10F using a suitable construction and attachment means.

The unitary body 70BD of the heat exchanger 70 is complementary in shape to the part of the trailing edge T of the bypass duct 10/fairing 10F to which it is attached. Still referring to FIG. 4, the unitary body 70BD defines a plurality of fins 70F that extend in the direction of the bypass airstream 10BP. The fins 70F help improve heat transfer rate per unit area of the heat exchanger 70 in at least some applications and/or flight conditions. It is contemplated that the fins 70F may be omitted.

Now referring to both FIG. 4 and FIG. 5, the unitary body 70BD further defines both a serpentine cooling channel 72 through the unitary body 70BD, and a serpentine air flow path 74 therethrough. It is contemplated that the body 70BD may be constructed of more than a single piece of material. These features help improve heat transfer rate per unit area of the heat exchanger 70 in at least some applications and/or flight conditions. As shown, in this embodiment the serpentine cooling channel 72 includes two sub-channels 72A, 72B that are in parallel with each other.

Now referring to FIGS. 6A-6C, a heat exchanger 80, which is yet another embodiment of the heat exchanger 40, is shown. The heat exchanger 80 is similar to the heat exchanger 40, and is therefore not described in detail and similar elements are labeled with the reference numerals of the corresponding elements of the heat exchanger 40.

One difference between the heat exchanger 80 and the heat exchanger 40 is that the heat exchanger 80 has a tortuous fluid conduit 82 defined by a triangular coiled tube of a suitable material, such as copper, or other types of metal. As shown, the inlet 40A of the heat exchanger 80 is one end of the tortuous fluid conduit 82 and the outlet 40B of the heat exchanger 80 is at another end of the tortuous fluid conduit 82. The servo fluid passes through the fluid conduit 82 and thereby cools down, when the heat exchanger 80 is in use.

A body 80B of the heat exchanger 80 is formed over the triangular coiled fluid conduit 82 in a shape that conforms to/is complementary to, and completes, a shape of the fairing 10F, and more particularly a shape of a corresponding part of the trailing edge T of the fairing 10F. In this particular example, the body 80B is formed from sheet metal or other suitable sheet material, and may have a V-shape, with rounded (shown) or peaked bottom. In some such embodiments, the tortuous fluid conduit 82 is thermally coupled to an inner surface of the body 80B. A bracket 84 is attached to the fairing 10F at an inside thereof, and supports the triangular coiled fluid conduit 82 at the trailing edge T of the fairing 10F. The heat exchanger 80 is thereby attached to the fairing 10F.

As shown, in the present embodiment the bracket 84 is disposed inside the fairing 10F. In some embodiments, the bracket 84 is disposed in its entirety inside the fairing 10F. The bracket 84 is attached to inside surfaces 11 of the fairing 10F. In this embodiment, the bracket 84 extends transversely relative to a length of the fairing 10F defined between the leading and trailing edges of the fairing 10F. In cases, the other embodiments of the heat exchanger 40, 50, 60, 70 described in this document are supported at the trailing edge T of the corresponding fairing 10F via one or more of the bracket 84.

In some cases where an existing fairing (for example, a fairing having the shape of the fairing 10F and the heat exchanger 80 assembly) of an engine 8 is retrofitted with one or more of the heat exchangers 40, 50, 60, 70, 80 of the present technology, at least a part of the trailing edge of the existing fairing is cut off in a radial direction to arrive at the fairing 10F shown in FIGS. 6A to 6C for example. A bracket, such as the bracket 84 is then inserted into the fairing 10F and attached to the inner surfaces 11 thereof as described above. One or more of the heat exchangers 40, 50, 60, 70, 80 of the present technology that complete the shape of the fairing 10F are then attached to the bracket 84 to return the fairing to, or at least close to, its original (pre-modification) shape.

While the gas turbine engine 8 has a single heat exchanger 40, 50, 60, 70 or 80 in the example embodiments described above, it is contemplated that the gas turbine engine 8 may have more than one heat exchanger 40, 50, 60, 70, 80 and/or a combination of one or more of the heat exchangers 40, 50, 60, 70, 80. It is contemplated that any suitable fluid conduit(s), such as the fluid conduits 42 and 44, and any suitable routing of the fluid conduit(s) may be used to fluidly connect the heat exchanger(s) 40, 50, 60, 70, 80 in each particular embodiment of the gas turbine engine 8 to provide for the functionality described in this document.

It is also contemplated that the heat exchangers 40, 50, 70, 80 according to the present technology may be provided as part engines as original equipment manufacturer (OEM) parts, or provided as retrofit kits for existing engines. In the latter case, the heat exchangers 40, 50, 70, 80 may be shaped to replace part(s) of the bypass duct 10/fairing 10F at the trailing edge T of existing engines for which the heat exchangers 40, 50, 70, 80 may be provided.

To retrofit an existing turbofan engine, in at least some cases, one or more parts of a trailing edge(s) of a fairing that defines an outlet of a bypass duct of the existing engine may be removed. One or more heat exchangers 40, 50, 70, 80 according to the present technology may be constructed to have the shape(s) of the removed part(s). The one or more heat exchangers 40, 50, 70, 80 may then be attached to the existing engine in place of corresponding one(s) of the removed part(s). It is contemplated that suitable fluid bleed(s) and fluid connections may be made between the one or more heat exchangers 40, 50, 70 and the existing engine and/or the aircraft with which the existing engine is used, as described above with regard to the gas turbine engine 8.

With the embodiments as described above in mind, there is provided a method of cooling a supply of compressed air in a turbofan aircraft engine 8 for use in a pneumatic actuator 46. In some embodiments, the method includes bleeding a supply of compressed air from a compressor assembly 22 of the aircraft engine 8, such as via the bleed conduit 42, and directing the supply of compressed air to an inlet 40A of a heat exchanger 40 disposed at a trailing edge T of a bypass duct 10 of the gas turbine engine 8. As seen above, in some embodiments, the trailing edge T is part of a bypass duct 10 of the gas turbine engine 8. The method may further include directing the supply of compressed air (which has passed through the heat exchanger 40) from an outlet 40B of the heat exchanger 40 to the pneumatic actuator 46. In some embodiments, the pneumatic actuator 46 may be a pneumatically operated valve for example, the valve being operated by the compressed air (servo fluid) supplied thereto from the heat exchanger 40.

It is contemplated that known materials and manufacturing methods may be used to construct and install the heat exchangers 40, 50, 70, 80 in each particular embodiment and application thereof. In some embodiments for example, a given one of the heat exchangers 40, 50, 70, 80 may be 3D printed into the trailing edge T of a corresponding fairing 10F so as to maintain an original shape that the fairing 10F was intended to have without having a heat exchanger integrated therein. It is contemplated that the heat exchangers 40, 50, 70, 80 according to the present technology may be used with fairings of an aircraft engine other than the fairing 10F shown and described above.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A gas turbine engine, comprising a fan assembly, a compressor assembly, a combustion chamber, a turbine assembly, a bypass duct conveying rearward a bypass airstream driven by the fan assembly when the gas turbine engine is in use, and a fairing extending across at least a portion of the bypass duct downstream of the fan assembly, the fairing having an airfoil-shaped body having first flow facing surfaces extending downstream from a leading edge of the airfoil-shaped body; and a heat exchanger having a body that is wedge shaped and forms a trailing edge of the airfoil-shaped body of the fairing, the heat exchanger body having second flow-facing surfaces which are aligned with the first flow-facing surfaces to complete the airfoil-shaped body of the fairing without protruding into the bypass airstream at an angle relative to the first flow-facing surface, wherein the first and second flow facing surfaces collectively form a substantially uninterrupted flow-facing surface formed by the fairing and the heat exchanger, the body of the heat exchanger including a base portion attached to the fairing and a rear end portion extending rearward from the base portion, the base portion of the body of the heat exchanger being complementary in shape to the fairing, an inlet of the heat exchanger being fluidly connected to the compressor assembly and an outlet fluidly connected to a pneumatic actuator of the gas turbine engine, the body having a tortuous fluid conduit inside the body, the tortuous fluid conduit extending radially through the body from the inlet to the outlet.

2. The gas turbine engine of claim 1, wherein the heat exchanger is connected to the fairing via a bracket.

3. The gas turbine engine of claim 2, wherein the bracket is disposed at least in part inside the fairing.

4. The gas turbine engine of claim 3, wherein the bracket is disposed in its entirety inside the fairing and is attached to at least one inner surface of the fairing, the inlet of the heat exchanger being one end of the tortuous fluid conduit and the outlet of the heat exchanger being at another end of the tortuous fluid conduit.

5. The gas turbine engine of claim 1, wherein the tortuous fluid conduit is defined by at least one coiled tube.

6. The gas turbine engine of claim 1, wherein the body has a wishbone shape.

7. The gas turbine engine of claim 1, wherein the rear end portion of the body of the heat exchanger defining slots extending through the rear end portion.

8. The gas turbine engine of claim 7, wherein the slots extend into the base portion.

9. The gas turbine engine of claim 7, wherein the slots extend in a direction of the bypass airstream.

10. The gas turbine engine of claim 1, wherein the tortuous fluid conduit is a flow channel extending through the body, the flow channel is fluidly connected to the at least one of the compressor assembly and the combustion chamber, and the flow channel occupies a majority of a volume of the body.

11. The gas turbine engine of claim 1, wherein the fairing is disposed inside the bypass duct.

12. The gas turbine engine of claim 1, wherein the pneumatic actuator is connectable to a pneumatic system of an aircraft.

13. The gas turbine engine of claim 1, wherein the body is a unitary body that defines both the tortuous fluid conduit forming a serpentine cooling channel through the unitary body and a serpentine air flow path through the unitary body, the cooling channel fluidly connecting the inlet to the outlet.

14. A gas turbine engine, comprising:
a fan assembly, a compressor assembly, a combustion chamber, a turbine assembly, and a bypass duct conveying rearward a bypass airstream driven by the fan assembly when the gas turbine engine is in use;
a fairing extending through the bypass duct and having an airfoil-shaped body defining first flow surfaces across which the bypass airstream flows; and
a heat exchanger having a body that forms a trailing edge the airfoil-shaped body of the fairing, the body of the heat exchanger having a triangular shape with a wider portion and a narrower portion extending downstream therefrom, the wider portion of the body of the heat exchanger being attached to the fairing, the body of the heat exchanger defining second flow-facing surfaces which are aligned with the first flow-facing surfaces to complete the airfoil-shape body of the fairing without protruding into the bypass airstream at an angle relative to the first flow surfaces;

wherein an inlet of the heat exchanger is fluidly connected to the compressor assembly via a bleed conduit and an outlet fluidly connected to a pneumatic actuator, the body having a tortuous fluid conduit inside the body, the tortuous fluid conduit extending radially through the body from the inlet to the outlet.

15. The gas turbine engine of claim 14, wherein the fairing defines a bypass air exhaust nozzle of the bypass duct of the gas turbine engine.

* * * * *